United States Patent [19]
Bunn et al.

[11] 3,784,360
[45] Jan. 8, 1974

[54] FLUID CATALYTIC CRACKING

[75] Inventors: Dorrance P. Bunn; Henry E. Jones, both of Houston, Tex.

[73] Assignee: Texaco Inc., New York, N.Y.

[22] Filed: Sept. 20, 1971

[21] Appl. No.: 182,030

[52] U.S. Cl. .............. 23/288 S, 208/164, 137/512, 137/527.8
[51] Int. Cl. ............................................. B01j 9/20
[58] Field of Search .................. 23/288 S; 208/164, 208/163

[56] References Cited
UNITED STATES PATENTS

| | | |
|---|---|---|
| 2,587,554 | 2/1952 | Weikart ............................ 23/288 S |
| 2,900,329 | 8/1959 | Osborne et al. ................. 23/288 S X |
| 2,994,659 | 8/1961 | Slyngstad et al. ................. 23/288 X |
| 2,998,309 | 8/1961 | Wilson, Jr. ........................ 23/288 S |
| 3,394,076 | 7/1968 | Bunn, Jr. et al. ............... 23/288 S X |
| 3,661,799 | 5/1972 | Cartmell ........................ 23/288 S X |
| 3,687,841 | 8/1972 | Saxton et al. ................... 23/288 S X |
| 3,690,842 | 9/1972 | Lockwood ...................... 23/288 S X |

Primary Examiner—Morris O. Wolk
Assistant Examiner—R. E. Serwin
Attorney—Thomas H. Whaley et al.

[57] ABSTRACT

A fluid catalytic cracking apparatus wherein the reaction zone comprises one or more risers and a reaction vessel. A constant inventory of catalyst is maintained in a fluidized state in the reaction vessel and catalyst is continuously withdrawn from the reaction at a rate equal to the rate catalyst enters the reaction vessel. An improved catalyst check valve connecting the reaction vessel and stripping zone controls the catalyst inventory and catalyst withdrawal rate.

3 Claims, 2 Drawing Figures

PATENTED JAN 8 1974          3,784,360

FLUID CATALYTIC CRACKING

BACKGROUND OF THE INVENTION

This invention relates to a method and apparatus for fluid catalytic cracking of hydrocarbon oils. More particularly, this invention relates to a method for maintaining a catalyst inventory within a reaction zone and to an apparatus for maintaining a constant catalyst inventory in the reaction zone.

In a fluid catalytic cracking process, hydrocarbon oils are reacted in the presence of a catalyst under conditions such that a portion of the hydrocarbon oils are converted to desired product. During the hydrocarbon conversion, coke is deposited upon the catalyst. Catalyst is removed from the reaction zone, from which it may be transferred to a stripping zone. In the stripping zone, occluded hydrocarbons are removed from the catalyst employing a stripping vapor such as for example steam. The stripping vapors and volatilized hydrocarbons are transferred from the stripping zone into the reaction zone from which they are subsequently recovered as components of the reaction zone hydrocarbon product. Stripped catalyst from the stripping zone is transferred to a regeneration zone wherein at least a portion of the coke is removed by contacting said stripped catalyst with an oxygen containing gas which causes combustion of the coke and regeneration of the catalyst. Regenerated catalyst is mixed with additional hydrocarbon oil to be converted in the reaction zone.

According to one method for converting hydrocarbons, regenerated catalyst and hydrocarbon vapors are combined near the bottom of a riser under reaction conditions. The catalyst-hydrocarbon mixture flows upward in the riser and is subsequently discharged into a reaction vessel. In the reaction vessel, hydrocarbon vapors are separated from the catalyst. In this method of cracking hydrocarbon oils, one or more risers may be employed. For instance, in U. S. Pat. Nos. 3,394,076 and 3,433,733, fluid catalytic cracking methods are described wherein two risers are employed. In the first riser, fresh hydrocarbon oil feed is combined with regenerated catalyst for reaction therein. In the second riser, recycle oil, comprising relatively high boiling components obtained from the cracked hydrocarbon product of the catalytic cracking reaction, is combined with regenerated catalyst and subjected to an additional cracking reaction.

In the reaction vessel, a bed of catalyst is maintained in a fluidized state by the passage of vapors therethrough. The fluidized catalyst bed segregates itself into a lower dense phase wherein the density of the catalyst bed is from about 0.5 to about 0.9 times the bulk density of the unfluidized catalyst, and into a dilute phase which has a solids concentration of only about 0.1 to 0.3 lbs. per cubic foot. Hydrocarbon vapors entering the reaction zone via the riser or risers provide a substantial proportion of the vapors required to maintain the catalyst bed in a fluidized state. Additional vapors may comprise primary stripping steam near the bottom of the dense phase which may be added for the purposes of separating a portion of the occluded hydrocarbons from the catalyst and maintaining the dense phase in a fluidized state.

Catalyst is continuously discharged from the risers into the reaction vessel, and catalyst is continuously withdrawn from the dense phase in order to maintain a desired catalyst inventory within the reaction vessel. The rate at which catalyst enters the reaction zone is a function of two separately controlled reaction variables; the ratio of catalyst to hydrocarbon in the reaction mixture and the flow rate of hydrocarbon oil in the risers. Therefore the rate at which catalyst enters the reaction vessel depends upon the selected ratio of catalyst to hydrocarbon and also upon the flow rate of hydrocarbon in the risers. In order to maintain a selected inventory of fluidized catalyst in the reaction vessel, it is necessary to withdraw catalyst from the dense phase at substantially the same rate at which catalyst enters the reaction vessel via the risers. According to methods of the prior art, the inventory of catalyst within the reaction vessel is maintained at a selected value by measuring a pressure differential between a point near the bottom of the dense phase and a point above the dense phase and controlling the rate at which catalyst is withdrawn from the dense phase to maintain the measured pressure differential at a preselected value. This method for controlling the catalyst inventory is accomplished by installing a pressure tap in the reaction vessel near the bottom of the dense phase and installing a pressure tap in the reaction vessel in the dilute phase. These pressure taps are connected to a differential pressure transmitter with piping or tubing. The differential pressure transmitter provides an output signal proportional to the difference in pressure between the lower tap and the upper tap. The output signal from the differential pressure transmitter is supplied to a control instrument which compares the measured differential pressure with a preselected set point value. Should the measured differential pressure vary from the set point, the control instrument supplies a signal to a valve actuator which is connected to a slide valve installed in the dense phase catalyst drawoff means. The valve actuator responds to the signal from the control instrument by adjusting the position of the slide valve. Thus, the rate at which dense phase catalyst is removed from the reaction vessel is varied in order to maintain the desired differential pressure across the fluidized catalyst bed.

In a fluidized catalytic cracking process such as described hereinabove a major portion of the cracking reaction may occur in the risers and a minor portion of the cracking reaction occurs in the reaction vessel. Control of the cracking reaction may be maintained to give a desired range of cracked hydrocarbon products by varying reaction varibles such as hydrocarbon space velocity in the riser, reaction temperature, and the catalyst to oil ratio. In such a process it has been found convenient to maintain the catalyst inventory in the reaction vessel at a constant value.

Catalyst removed from the dense phase in the reaction vessel has coke deposited upon it which adversely affects its catalytic activity. Also, even where primary stripping is provided in the reaction vessel, such dense phase catalyst also has appreciable amount of relatively high boiling hydrocarbon liquid occluded thereon. The catalyst removed from the reaction vessel is passed into a regeneration zone wherein coke and any other combustible materials are removed by combustion with an oxygen containing gas such as air. The removal of coke and other combustibles from the catalyst restores its catalytic activity thereby making it suitable for further use in the fluidizied catalytic cracking process. Rather than burning, and thereby losing, the heavy oils occluded within the catalyst withdrawn from the reaction vessel, it is preferable to recover a substantial proportion of such occluded oil by stripping the withdrawn catalyst with a stripping vapor prior to passing such catalyst to the regeneration zone. Accordingly, catalyst withdrawn from the reaction vessel may be passed through a secondary stripping zone wherein it is intimately contacted with a stripping vapor, preferably steam. A major portion of the occluded liquid hydrocarbons are thereby vaporized and stripped from the catalyst. The secondary stripping vapor and vaporized hydrocarbons may conveniently be passed into the reaction vessel at a point above the fluidized catalyst bed via a stripper vent line. By employing this means for disposing of the stripping vapors and vaporized hydrocarbon, the vaporized hydrocarbon may be conveniently recovered along with the hydrocarbon product from the reaction vessel. Additionally, by passing such vapors from the secondary stripping zone into the reaction vessel above the fluidized catalyst bed, the pressure differential between the reaction vessel and the secondary stripping zone is limited to the pressure drop through the stripping vent line. This pressure drop is small and may be controlled by properly sizing the cross section area of the stripping vent line. Therefore, since the pressure differential between the reaction zone and the secondary stripping zone is small, the removal of catalyst from the reaction vessel into the secondary stripping zone is not complicated by large differences in pressure between the two zones.

SUMMARY OF THE INVENTION

Now, according to the method of the present invention, a fluidized catalytic cracking process is provided wherein a preselected inventory of catalyst is maintained in the reaction vessel, wherein catalyst is removed from the reaction vessel at a rate equal to the rate at which catalyst is added to said reaction vessel and wherein catalyst removed from the reaction zone is regenerated and recycled for further use in the process. More particularly, an improved apparatus is provided for maintaining the inventory of fluidized catalyst within the reaction zone and controlling the rate at which such catalyst is withdrawn from the reaction zone at a rate equivalent to that at which catalyst enters said reaction zone.

By employing the present invention, the two pressure taps, the differential pressure instrument, the control instrument, the valve actuator, and the slide valve which were employed in prior art catalyst level control devices may be eliminated. The elimination of such equipment results in a substantial cost saving and maintenance of such equipment is eliminated. Additionally, the rate of withdrawal of catalyst from the reaction zone is responsive to the rate of addition of catalyst to said zone without reliance upon intravening instrumentation which is subject to error and perhaps failure.

Figure 1:
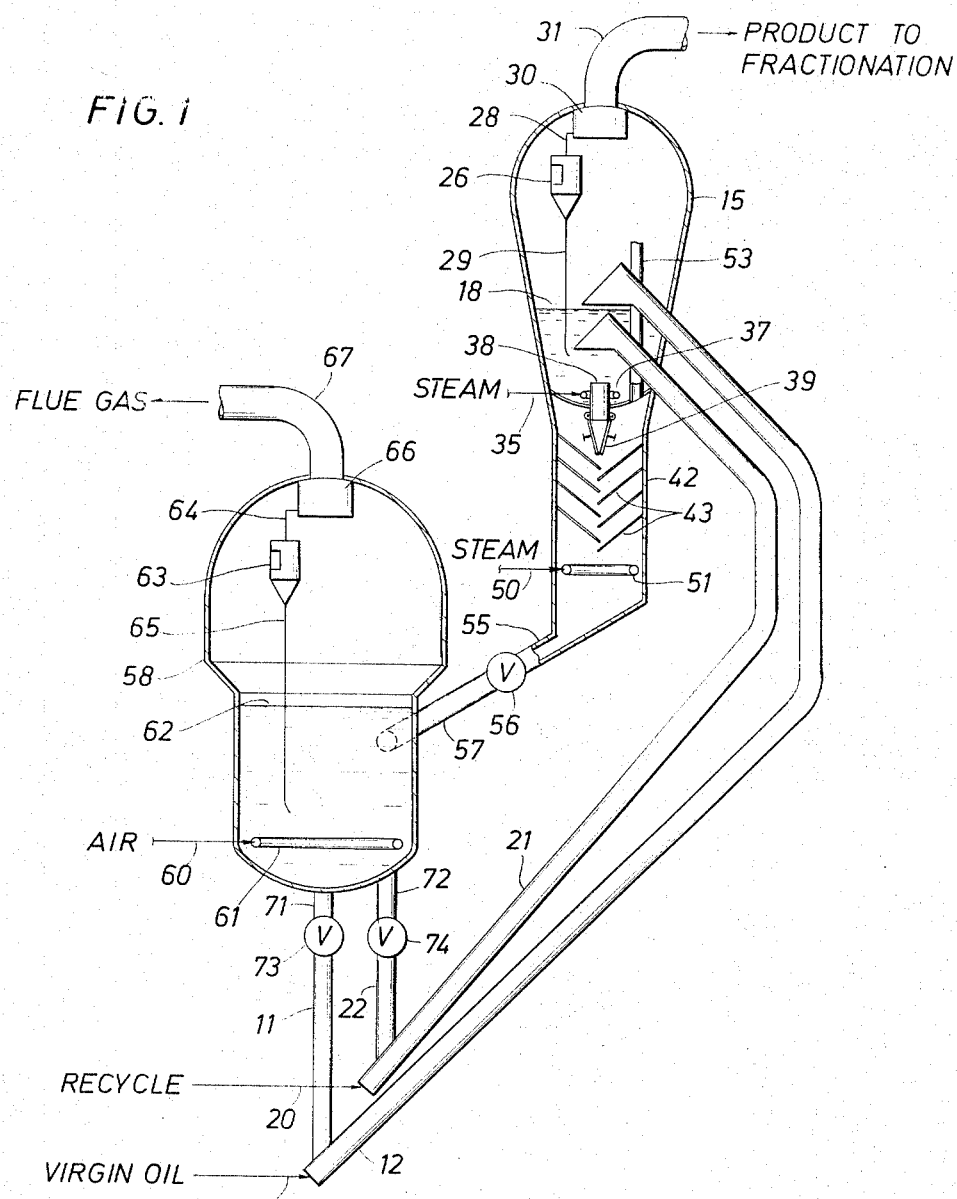
FIG. 1 of the drawings is a schematic diagram of a fluidized catalytic cracking process employing the improvement of the present invention.

DETAILED DESCRIPTION OF THE INVENTION:

It is known that recycle stocks such as cycle gas-oil separated from the fluid catalytic cracking products are more refractory than virgin charge stock. Preferably, these refractory recycle stocks are cracked under more severe conditions than virgin stocks. It is also known that a short period of good contact between a charge stock and the catalyst results in superior yields as compared to a longer period of poor contact. Accordingly, fluid catalytic cracking processes have been devised wherein virgin charge stock to the process may be reacted under one set of conditions and recycle charge stock to the process reacted under more severe conditions. Various apparatus configurations have been proposed for obtaining different cracking conditions for virgin charge stock and for recycle charge stock and to achieve more intimate catalyst-oil contact. In one configuration catalyst and virgin charge stock are charged to a first riser and effluent from said first riser is discharged into a reactor vessel at an intermediate point above the catalyst dense phase. Catalyst and recycle hydrocarbon are charged into a second riser and the hydrocarbon-catalyst mixture is discharged from the second riser into the reactor vessel below the surface of the catalyst dense phase. Thus, the recycle vapor, by passing through the dense phase catalyst, has an extended contact with the catalyst. By employing such an apparatus configuration the virgin charge stock may be subjected to cracking conditions for a relatively short period of good contact with the cracking catalyst. The more refractory recycle charge is maintained in the presence of the cracking catalyst for a longer time.

When operating a fluid catalytic cracking process employing such an apparatus configuration, it has been found that the catalyst inventory in the reaction zone may not be substantially altered without changing the depth of the dense phase bed. Substantial changes in the depth of the dense phase bed may lead to undesirable consequences. For example, if the dense phase bed inventory increases the virgin charge stock riser outlet may become submerged in the dense phase, thereby increasing the contact time of the virgin charge stock with catalyst and resulting in decreased yields of desirable cracked products. On the other hand, when the dense phase bed inventory is decreased, the recycle charge stock discharging into the dense phase may not have sufficient contact time with the catalyst to obtain proper cracking. Therefore, it has been found convenient to operate such a fluid catalytic cracking process with a relatively constant catalyst inventory in the reaction zone.

According to the method of the present invention an improved catalytic cracking process is disclosed wherein the catalyst inventory within a reactor vessel is maintained constant employing improved means for transferring catalyst from the reactor vessel to a secondary stripping zone. The method of the present invention may be better understood by reference to FIG. 1 of the drawing which figure illustrates one embodiment by which the method of the present invention may be practiced. It is not intended to restrict the invention by said FIG. 1, since modifications may be made within the scope of the claims without departing from the spirit thereof.

Referring to FIG. 1 of the drawing, a virgin gas oil in line 10 is contacted with hot regenerated catalyst from standpipe 11 at a temperature of about 1,200° F. in the inlet portion of a fresh feed riser 12. The resulting suspension of catalyst in oil vapor at a temperature of about 920° F. and at an average velocity of about 33 ft.

per second passes upward through fresh feed riser 12 and into reactor vessel 15. Fresh feed riser 12 terminates in a downwardly directed outlet. Conditions prevailing in the fresh feed riser include a catalyst to oil weight ratio of 5.6 and a weight hourly space velocity of 69.5. The vapor velocity in the fresh feed riser 12 is about 40 ft. per second providing a residence time of about 4.0 seconds. Substantial conversion of the fresh feed occurs in the riser and at these conditions amounts to a conversion of 32 weight percent of the fresh feed into product boiling below 430° F.

A heavy cycle gas oil fraction, separated from the cracked product in fractionation equipment not shown, having a gravity of about 22° API and an end point temperature of about 725° F. is introduced through line 20 into the inlet section of a recycle riser 21 wherein it is contacted with hot catalyst from standpipe 22. The resulting catalyst - oil vapor mixture at a temperature of about 920° F. passes upward through the recycle riser 21 at an average velocity of about 28 feet per second with an average residence time of about 5.0 seconds. Other conditions in the recycle riser include a catalyst to oil weight ratio of 6.2 and a weight hourly space velocity of 51.8. About 16 percent of the gas oil recycle is converted to products boiling below 430° F. by the time the products are discharged through the outlet of recycle riser 21 into the lower portion of the reactor vessel 15. The vapor effluent of the recycle riser 21 passes upwardly through a dense phase catalyst bed in reactor 15 affecting further conversion of the recycle gas oil into 39 percent products boiling below 430° F. Other conditions in the dense phase bed in reactor 15 include a catalyst to oil ratio of 12.3 and a weight hourly space velocity of 3.0. The combined fresh feed riser cracking, recycle riser cracking and reactor bed cracking provide an overall conversion of 70 volume percent of the fresh feed into products boiling below 430° F. The vapor velocities in the reactor vessel 15 are 1.7 feet per second at the point at which the recycle riser 21 discharges, 3.1 feet per second at the point where the fresh feed riser 12 discharges and 1.5 feet per second in the upper portion of the reactor vessel 15.

Cracked product vapors disengage from the catalyst dense phase bed at level 18. The level of the dense phase bed 18 is maintained below the discharge of the fresh feed riser 12 thereby allowing cracked fresh feed vapors to disengage the catalyst without an extended catalyst contact time which would result from passing such vapors through the dense phase bed. The desired level 18 of the dense phase bed is obtained by maintaining a constant catalyst inventory within the reactor vessel 15 and controlling the catalyst fluidization vapor velocity through said dense phase bed, as will hereinafter be further described.

The vapors and entrained catalyst passing upward through the reactor vessel 15 enter cyclone 26 wherein entrained catalyst is separated from the vapors and returned to the catalyst bed through dip leg 29. Although a single cyclone is shown for clarity, it will be understood that several cyclones may be assembled in series to achieve substantially complete separation and a plurality of such assemblies may be employed to handle the volume of vapor encountered. Effulent vapors pass from cyclone 26 through line 28 into a plenum chamber 30. From the plenum chamber 30, vapors are discharged from the reactor vessel 15 through line 31.

Vapor line 31 conveys the hydrocarbon vapors to a fractional distillation zone, not shown, wherein the vapors are separated into desired product and recycle streams by methods well known in the art.

Steam in line 35 is passed to steam ring 37 and discharges near the bottom of the reactor vessel 15 at a point just below the inlet of catalyst withdrawal standpipe 38. The steam discharged from steam ring 37 and the recycle vapors discharged from recycle riser 21 provide vapors to maintain the dense phase catalyst bed in a fluidized state. At a selected recycle gas oil vapor rate, the level 18 of the dense phase catalyst bed may be adjusted while maintaining a constant catalyst inventory in the reactor vessel 15 by adjusting the rate of steam discharge through steam ring 37.

Dense phase catalyst in the lower portion of reactor 15 passes downwardly through the standpipe 38 and a counterweighted check valve 39 into a stripping zone 42. The catalyst valve 39 is equipped with counter weights arranged to exert a closing force upon the valve. The weight of catalyst collected in the standpipe 38 and in the dense phase bed exert an opening force upon catalyst valve 39. In the operation of a fluidizd catalyst cracking process, the inventory of catalyst as discharged from the risers 12 and 21 will increase in the reactor vessel 15 until the head of catalyst above the catalyst valve 39 overcomes the closing force exerted by the counterweights. When the head of catalyst balances the force of the counterweights, additional catalyst added to the reactor vessel 15 will cause the catalyst valve 39 to open and allow catalyst to pass from the reaction vessel 15 to the stripping zone 42 thereby restoring the balance between the head of catalyst above the catalyst valve 39 and the closing force of the counterweights. In the operation of a fluidized catalytic cracking process wherein catalyst is continuously entering the reaction vessel 15, the catalyst valve 39 continuously passes catalyst from the reaction vessel 15 to the stripping zone 42 to maintain a constant catalyst inventory in the reactor vessel 15.

In the stripping zone 42 baffles are attached to the wall of said stripping zone 42. Steam in line 50 is discharged through steam ring 51 into the lower portion of the stripping zone 42 below the baffles 43. Steam rising through the stripping zone 42 vaporizes and separates occluded and entrained hydrocarbons from the catalyst entering the stripping zone 42 via the catalyst valve 39. Steam and vaporized hydrocarbons pass upwardly from the stripping zone 42 through a stripper vent line 53 discharging into the upper portion of the reactor vessel 15 above the fluidized catalyst dense phase level.

Stripped catalyst is withdrawn from the bottom of the stripping zone 42 through a spent catalyst standpipe 55 at a rate controlled by slide valve 56 and discharges through standpipe 57 into regenerator 58. In regenerator 58 the spent catalyst is contacted with air introduced through line 60 and air ring 61 whereupon coke is burned and the spent catalyst is regenerated. Catalyst undergoing regeneration in regenerator 58 forms a dense phase bed having a level 62. Flue gas resulting from coke burned from the surface of the catalyst passes upwardly through the regenerator 58 and enters cyclone 63 wherein entrained catalyst is separated from the flue gas and is returned to the regenerator dense phase bed through dip leg 65. Cyclone 63, although represented as a single vessel may, of course, comprise an assembly of cyclones arranged in parallel and in series to effect substantially complete separation of entrained solids from the flue gas. Effluent flue gas from cyclone 63 passes through line 64 into plenum chamber 66. From the plenum chamber 66 the flue gas exits the regenerator vessel 58 through flue gas line 67 to vent facilities, not shown.

Regenerated catalyst is withdrawn from the bottom of the regenerator 58 through line 71 and 72 at rates controlled by slide valves 73 and 74 to supply hot regenerated catalyst to standpipes 22 and 11 as described above.

Figure 2:
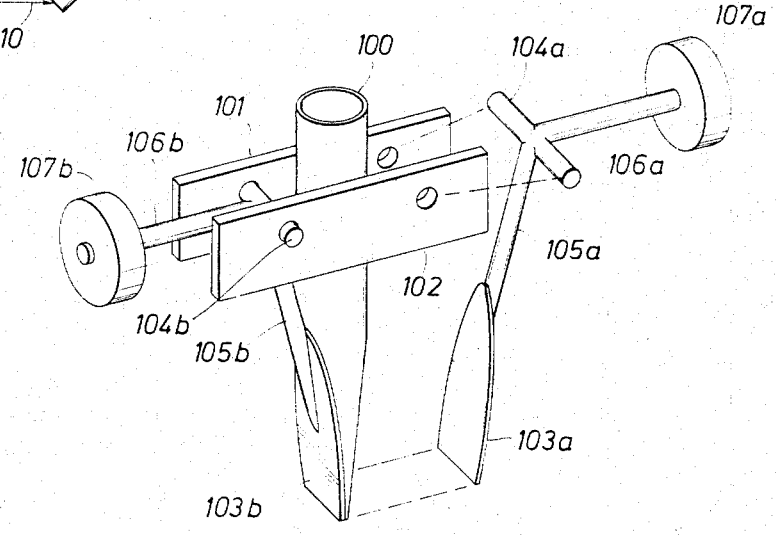
FIG. 2 of the drawings is a schematic drawing in cross section showing in more detail a portion of the system of FIG. 1.

FIG. 2 of the drawings illustrates in detail a catalyst valve which may be employed in the practice of the present invention and it is not intended to restrict the invention thereby since modifications may be made within the scope of the claims without departing from the spirit thereof.

In FIG. 2 the catalyst valve is shown in an isometric view with one closure element for said valve shown in exploded view for clarity and the other closure element shown in a normal relationship to the remaining elements of the catalyst valve.

Referring now to FIG. 2 of the drawing, a valve body 100 comprising vertically disposed pipe having an open upper end and a lower end is attached to parallel support members 101 and 102. The upper end of the valve body extends above support members 101 and 102 and the lower end of the valve body extends below said support members 101 and 102. The lower end of valve body 100 is cut such that the lower end of said valve body 100 defines two semi-elliptical spaces in allochiral relationship. Flapper vanes 103A and 103B comprising elliptical sections are located such that when said vanes 103A and 103B are in a closed position the semi-elliptical spaces defined by valve body 100 are completely covered. For clarity of detail flapper vane 103A is shown in an exploded view and flapper vane 103B is shown in a closed position. Support members 101 and 102 in a parallel relation comprise vertically disposed plates separated by the width of the valve body 100. Support plate 101 has two holes in horizontal alignment symmetrically disposed upon either side of the valve body 100 and support plate 102 has two similar holes in axial alignment with the holes in support plate 101. Bearing rod 104A extending through axially aligned holes is pivotally mounted between support plates 101 and 102 upon one side of valve body 100 and bearing rod 104B extending through axially aligned holes is pivotally supported between support members 101 and 102 upon the other side of valve body 100. Connecting member 105A, attached to bearing rod 104A at a 90° angle extends downwardly and flapper vane 103A is attached thereto. Connecting member 106A is attached to bearing rod 104A at a 90° angle and is angularly disposed to connecting member 105A. A weight 107A is attached to connecting member 106A at a distance from the bearing rod 104A. The weight 107A is disposed in relation to flapper vane 103A in such a manner that a rotational torque force is imposed upon the flapper vane 103A. The rotational torque forces the flapper vane 103A against the valve body 100 thereby covering the semi-elliptical section formed by the lower part of the valve body 100.

As hereinbefore stated, flapper vane 103B is an allochiral analogue of flapper vane 103A. By the same token, connecting member 105B, bearing rod 104B, connecting member 106B, and weight 107B are the allochiral analogues of connecting member 105A, bearing rod 104A, connecting member 106A, and weight 107A respectively. It is to be understood that flapper vane 103B operates in a manner analogous to the operation of flapper 103A.

In a fluidized catalytic cracking process wherein a valve such as shown in FIG. 2 and described above is installed for passing catalyst from the reactor vessel 15 into the stripping zone 42, the inventory of catalyst in the reactor vessel 15 exerts a pressure inside the valve body 100 against the flapper vanes 103A and 103B. The torque force imposed upon the flapper vanes by weights 107A and 107B opposes the pressure imposed by the catalyst. At equilibrium, an increase in catalyst inventory in the reactor vessel 15 will create a pressure inside the valve body 100 sufficient to overcome the torque force imposed by the weights. Thus, the flapper vanes will be forced away from the valve body 100 and catalyst will pass from the reactor vessel 15 through the valve body 100 into the stripping zone 42. Sufficient catalyst will pass through the valve body 100 to reduce the catalyst inventory of the reactor vessel 15 until torque force imposed by the weight 107A will close the flapper vanes 103A and 103B.

Under actual operating conditions in a fluidized catalytic cracking process wherein catalyst is continually discharging into the reactor vessel 15, the pressure exerted by the catalyst inventory will keep the flapper vanes continuously pushed away from the valve body 100 thereby allowing a continuous flow of catalyst from the reactor vessel 15 to the stripping zone 42. The torque force provided by the weights acts in opposition to the pressure exerted by the catalyst inventory such that the flapper vanes are maintained in a position such that the flow of catalyst through the valve body 100 is limited to the amount of catalyst entering the reaction vessel 15. By selecting the length of the connecting members 106A and 106B and the weights of 107A and 107B, a torque force of known value may be imposed upon the flapper vanes 103A and 103B. This known torque will then support a certain pressure exerted by the catalyst inventory upon the flapper vanes. Thus, by properly selecting the length of the connecting members 106A and 106B, and the weights 107A and 107B a torque force may be provided which is sufficient to support the desired catalyst inventory in the reaction vessel.

We claim:

1. A fluidized catalytic cracking apparatus comprising:
   a. a reaction vessel;
   b. a stripping zone vertically mounted below said reaction vessel;
   c. a counter weighted check valve connecting the bottom of the reaction vessel and the top of the stripping zone comprising a valve body having a vertical opening therethrough, a flapper vane for closing the bottom of said valve body and a counter weight connected to said flapper vane for maintaining said flapper vane in a closed position and supporting a selected inventory of catalyst in the reaction vessel;
   d. a catalyst regeneration zone;
   e. means for passing stripped catalyst from the stripping zone to the regeneration zone;

f. means for combining regenerated catalyst and hydrocarbon oil; and g. means for passing such catalyst-hydrocarbon mixture into the reaction vessel.

2. A fluidized catalytic cracking apparatus comprising:

a. a reaction vessel;

b. a stripping zone vertically mounted below said reaction vessel;

c. a counterweighted check valve connecting the bottom of the reaction vessel and the top of the stripping zone, said check valve comprising a valve body having an open top and a bottom shaped to define an elliptical section, support members horizontally disposed to said valve body and attached thereto, c. a flapper vane pivotally attached to said support member and disposed to cover the elliptical section defined by the valve body, and a weight attached to the flapper vane for forcing the flapper vane against the elliptical section;

d. a catalyst regeneration zone;

e. means for passing stripped catalyst from the stripping zone to the regeneration zone;

f. means for combining regenerated catalyst and hydrocarbon oil; and g. means for passing such catalyst-hydrocarbon mixture into the reaction vessel.

3. The counterweighted check valve of claim 2 wherein the valve body is shaped to define two semi-elliptical sections in allochiral relation; and wherein a weighted, pivotally mounted flapper vane covers each semi-elliptical section.

* * * * *

UNITED STATES PATENT OFFICE
CERTIFICATE OF CORRECTION

Patent No. 3,784,360      Dated January 8, 1974

Inventor(s) Dorrance P. Bunn Jr. and H. Blandin Jones

It is certified that error appears in the above-identified patent and that said Letters Patent are hereby corrected as shown below:

"Henry E. Jones" should read --H. Blandin Jones--.

Signed and sealed this 29th day of October 1974.

SEAL)
Attest:

McCOY M. GIBSON JR.      C. MARSHALL DANN
Attesting Officer      Commissioner of Patents